(12) United States Patent
Cho (10) Patent No.: US 11,531,882 B2
(45) Date of Patent: Dec. 20, 2022

(54) METHOD AND SYSTEM FOR AUTOMATICALLY CLASSIFYING IMAGES

(71) Applicant: NHN CORPORATION, Gyeonggi-do (KR)

(72) Inventor: Myounghoon Cho, Gyeonggi-do (KR)

(73) Assignee: NHN CORPORATION, Gyeonggi-Do (KR)

( * ) Notice: Subject to any disclaimer, the term of this patent is extended or adjusted under 35 U.S.C. 154(b) by 728 days.

(21) Appl. No.: 16/528,499

(22) Filed: Jul. 31, 2019

(65) Prior Publication Data

US 2020/0074299 A1 Mar. 5, 2020

(30) Foreign Application Priority Data

Aug. 31, 2018 (KR) .................. 10-2018-0103266

(51) Int. Cl.
*G06G 7/00* (2006.01)
*G06N 3/08* (2006.01)
(Continued)

(52) U.S. Cl.
CPC .............. *G06N 3/08* (2013.01); *G06F 16/51* (2019.01); *G06F 16/54* (2019.01); *G06K 9/628* (2013.01);
(Continued)

(58) Field of Classification Search
CPC .......... G06N 3/08; G06N 3/04; G06N 3/0454; G06F 16/51; G06F 16/54; G06F 3/0482; G06K 9/6215; G06K 9/628; G06K 9/6267; G06K 9/6282; G06T 7/70; G06T 2207/20084; G06T 2207/30196;
(Continued)

(56) References Cited

U.S. PATENT DOCUMENTS

2002/0087431 A1* 7/2002 Morishima ........ G06Q 30/0633
705/26.8

FOREIGN PATENT DOCUMENTS

KR 10-2011-0045293 5/2011
KR 10-2011-0123848 11/2011
(Continued)

OTHER PUBLICATIONS

Office Action dated Sep. 16, 2019 for Korean Application No. 10-2018-0103266 and its English machine translation by Google Translate.

*Primary Examiner* — Charlotte M Baker
(74) *Attorney, Agent, or Firm* — Ladas & Parry, LLP (57) ABSTRACT

A processor of an image automatic classification server may perform a method for automatically classifying images. The method includes receiving partial or entire contents of a plurality of products from an online shopping website, classifying the received contents of the plurality of products into each of the products and storing the contents classified by each of the products, extracting a plurality of product images of one product among the plurality of products form the stored contents, and automatically classifying the extracted product images of the one product into a plurality of categories to generate information for the one product. The information for the one product comprises information that classifies the plurality of product images of the one product for each of a plurality of categories to provide the classified product images to be selectable.

17 Claims, 7 Drawing Sheets

(51) Int. Cl.
| | |
|---|---|
| *G06F 16/51* | (2019.01) |
| *G06F 16/54* | (2019.01) |
| *G06N 3/04* | (2006.01) |
| *G06K 9/62* | (2022.01) |
| *G06T 7/70* | (2017.01) |
| *G06F 3/0482* | (2013.01) |
| *G06Q 30/06* | (2012.01) |

(52) U.S. Cl.
CPC ............ *G06K 9/6215* (2013.01); *G06N 3/04* (2013.01); *G06T 7/70* (2017.01); *G06F 3/0482* (2013.01); *G06Q 30/0601* (2013.01); *G06T 2207/20084* (2013.01); *G06T 2207/30196* (2013.01)

(58) Field of Classification Search
CPC .. G06Q 30/0601; G06V 10/82; G06V 30/413; G06V 10/764; G06V 30/19173
USPC .................. 706/20; 705/7.34, 26.8, 27.2
See application file for complete search history.

(56) References Cited

FOREIGN PATENT DOCUMENTS

| KR | 10-2016-0096832 | 8/2016 |
|---|---|---|
| KR | 10-2018-0080098 | 7/2018 |

\* cited by examiner

METHOD AND SYSTEM FOR AUTOMATICALLY CLASSIFYING IMAGES

CROSS REFERENCE TO RELATED APPLICATION(S)

This application claims the priority to Korean Patent Application No. 10-2018-0103266, filed on Aug. 31, 2018, which is all hereby incorporated by reference in its entirety.

BACKGROUND

Technical Field

The present disclosure relates to a method and a system for automatically classifying images.

More specifically, some embodiments of the present disclosure relate to a method and a system for automatically classifying and reconfiguring various images on an online shopping webpage, such as a full or desktop version of the online shopping webpage or a PC web based on a convenience of a mobile version of the online shopping webpage or a mobile web.

Related Art

With a rapid development of a smart mobile environment, a mobile web shopping mall industry is growing day by day. Thus, in order to increase competitiveness of a full or desktop version of an online shopping webpage or a PC web (personal computer web) shopping mall, it is becoming a universal trend to provide the PC web shopping mall by turning the PC web shopping mall into a mobile version of the online shopping webpage or the mobile web shopping mall.

However, there may be a need for a method and a system for effectively reconfiguring various images (e.g., a product image, a wearing image, a product material and/or a product color image, etc.) existing on the PC web shopping mall to suit a convenience of the user of the mobile web shopping mall.

Further, as a neural network that imitates a human brain is devised and a deep learning technology in which a computer learns by itself by combining and analyzing external data is developed, an AI (Artificial Intelligence) has made a dramatic leap forward.

Thus, computers may replace humans, analyze vast amounts of data, and cluster or classify objects or the data.

Further, with the development in computer technology, a Json (Java Script Object Notation) file format, which is suitable for transmitting and receiving vast amounts of the data, has been used. Therefore, data transmitting and receiving by combining a data format technology that has become lighter is available.

PRIOR ART DOCUMENT

Patent Document (Patent Document 1) Korean Patent Application Publication No. 10-2016-0096832 A

SUMMARY OF THE INVENTION

Various embodiments of the present disclosure may provide a method and a system for automatically classifying images for effectively reconfiguring various images displayed on a full or desktop version of an online shopping webpage or a PC web shopping mall in order to provide a convenience to an user of a mobile version of the online shopping webpage or a mobile web shopping mall and efficiently and fastly classify images with less resources.

More specifically, some embodiments of the present disclosure may provide a method and a system for automatically classifying images that automatically classify images randomly arranged on the full or desktop version of an online shopping webpage or the PC web shopping mall into a format suitable for a mobile web construction in order to solve a problem of manually classifying various product images randomly listed on the PC web shopping mall for the convenience of the user of the mobile version of the online shopping webpage or the mobile web shopping mall during turning the PC web shopping mall into a mobile web shopping mall.

However, technical problems to be solved by the embodiment of the present invention is not limited to the technical problem as described above, and other technical problems may exist.

In an aspect, a method for automatically classifying images according to an embodiment includes: obtaining entire contents of a plurality of products from a web shopping mall; classifying entire contents for each of the products from the obtained entire contents of the plurality of products and storing the entire contents for each of the products; extracting a plurality of product images from entire contents of one product; and automatically classifying the extracted plurality of product images at least one time to generate final providing information for said one product. The final providing information is information that classifies the plurality of product images for said one product for each of a plurality of categories to provide the classified product images to be selectable.

In one embodiment, the method may further include obtaining product information of said one product based on the entire contents of said one product. The product information may include information that indicates whether said one product belongs to a product type category of one of a top, a bottom, and a dress.

The extracting of the plurality of product images from the entire contents of said one product may include: separating adjacent product images from each other based on whether a text or a blank exists between the adjacent product images.

The automatically classifying of the extracted plurality of product images at least one time to generate the final providing information for said one product may include: primarily classifying the product images into at least one category of a wearing shot and a product shot based on whether a product is worn.

The primarily classifying of the product images may include: classifying the product images into the wearing shot category when the product images have the pose and classifying the remaining product images into the product shot category.

The automatically classifying of the extracted plurality of product images at least one time to generate the final providing information for said one product may include: when the primarily classified images are the wearing shots, secondarily classifying the wearing shots into at least one category of a front shot, a rear shot, a full body shot, a close-up shot, a stand shot or an other pose shot based on a pose type.

The secondarily classifying of the wearing shots may include: detecting rear shots from the wearing shots; detecting full body shots from front shots excluding the rear shots and then classifying the remaining front shots as close-up shots; and classifying the full body shots into stand shots and other pose shots.

The automatically classifying of the extracted plurality of product images at least one time to generate the final providing information for said one product may include: when the primarily classified images are not the product shots, secondarily classifying the product shots into a category of one of a front side shot, a rear side shot, an upper side shot, a lower side shot, a left side shot, or a right side shot based on a view point.

The method may further include classifying detail shots captured details of said one product from the product shot.

The automatically classifying of the extracted plurality of product images at least one time to generate the final providing information for said one product further may include: finally classifying the secondarily classified images into main shots and the remaining sub shots of the secondarily classified category.

Criterion for finally classifying the main shots and the sub shots may be a size of a product exposed area in the product image or a probability that the category to which the product images are secondarily classified and belong is applied to the product images.

The final providing information may be information that outputs product information for each product, a name for each category based on the secondary classification, and a main shot of the secondarily classified category.

The final providing information may include an interface that, when an input of selecting main shots of one category, additionally and collectively displays the remaining sub shots belongs to said one category.

The method may further include generating the final providing information as a file of a Json format and transmitting the final providing information to a user.

DESCRIPTION OF EXEMPLARY EMBODIMENTS

The present invention may apply various modifications and have various embodiments. Therefore, specific embodiments are illustrated in the drawings and described in detail in the detailed description. Effects and features of the present invention, and a method for achieving the same, will become apparent by referring to embodiments detailed below in conjunction with the drawings. However, the present invention is not limited to embodiments disclosed below, but may be implemented in various forms. In an embodiment described below, the terms first, second, etc. are used for the purpose of distinguishing one element from another element, not limiting. Further, singular expressions include plural expressions unless the context clearly dictates otherwise. Further, terms such as "to include" or "to have" mean that there is a feature or component described in the specification, but do not preclude the possibility that one or more other features or components may be added. Further, in the drawings, for convenience of description, the components may be exaggerated or reduced in size. For example, size and thickness of each component illustrated in the drawings are arbitrarily illustrated for convenience of description, and thus the present invention is not necessarily limited thereto. Hereinafter, embodiments of the present invention will be described in detail with reference to the accompanying drawings. In the following description with reference to the drawings, the same or corresponding components are denoted by the same reference numerals, and redundant description thereof will be omitted.

Figure 1:
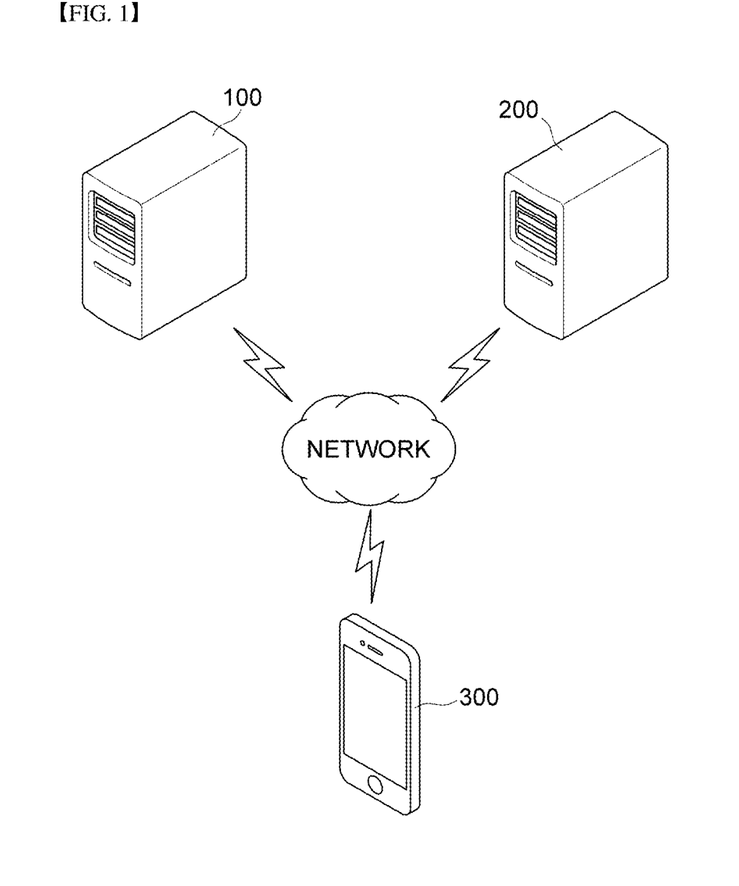
FIG. 1 is a conceptual diagram of an image automatic classification system according to an embodiment of the present disclosure.

FIG. 1 is a conceptual diagram of an image automatic classification system according to an embodiment of the present disclosure.

Referring to FIG. 1, a system for automatically classifying images according to an embodiment may include a shopping mall server 100, an image automatic classification server 200, and a terminal 300. A method for automatically classifying images according to an embodiment of the present disclosure may be implemented on the shopping mall server 100, the image automatic classification server 200, and the terminal 300.

In this connection, each component in FIG. 1 may be connected to each other via a network. The network refers to a connection structure that allows information or data exchanging between respective nodes such as the shopping mall server 100, the image automatic classification server 200 and/or the terminal 300, and the like. Examples of such a network include a 3GPP (3rd Generation Partnership Project) network, an LTE (Long Term Evolution) network, a WIMAX (World Interoperability for Microwave Access) network, an Internet, a LAN (Local Area Network), a Wireless LAN (Wireless Local Area Network), a WAN (Wide Area Network), a PAN (Personal Area Network), a Bluetooth network, a satellite broadcast network, an analog broadcast network, a DMB (Digital Multimedia Broadcasting) network, and the like, but is not limited thereto.

Although embodiments of the present disclosure are described primarily with respect to clothing images on an online shopping mall, it will be appreciated that various embodiments may be implemented within other types of images, such as, but not limited to, accessories, household items, or the like.

Further, in embodiments of the present disclosure below, for convenience of description, a web shopping mall provided via a desktop or PC is described as a "web shopping mall" or a full or desktop version of an online shopping website, and a web shopping mall provided via a mobile terminal is described as a "mobile shopping mall" or a mobile version of an online shopping website. Online shopping is a form of electronic commerce which allows consumers to directly buy goods or services from a seller over the Internet using a web browser.

Shopping Mall Server

First, the shopping mall server 100 may provide to a user terminal, such as the terminal 300, with an online shopping webpage or an electronic commerce web shopping mall where customers may order and sellers may sell products, goods or services via the network.

Further, this shopping mall server 100 may transmit and receive necessary data in an image automatic classification system.

Figure 2:
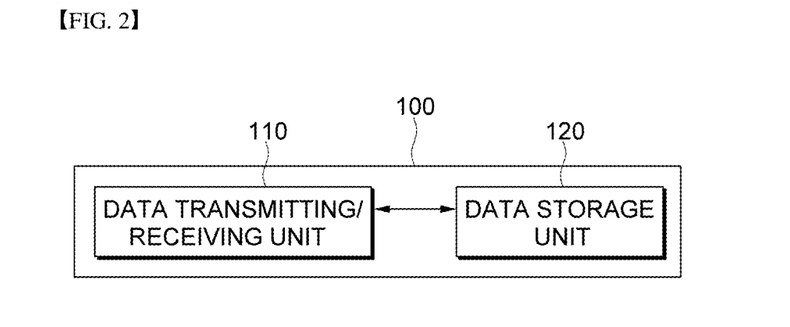
FIG. 2 is a block diagram of a shopping mall server according to an embodiment of the present disclosure.

For example, referring to FIG. 2, the shopping mall server 100 may include a data transmitting/receiving unit or data transmitter/receiver 110 and a data storage unit 120.

First, the data transmitting/receiving unit 110 may transmit product images on the web shopping mall for processing image automatic classification to the image automatic classification server 200 and receive final providing information or data or the processed information or data generated from the image automatic classification server 200.

In this connection, the final providing information or data or the processed information or data may refer to output information reconfigured and generated by the image automatic classification server 200 to easily distinguish and identify automatically classified images.

In this connection, the final providing information or data or the processed information or data may further include information for providing an interface that may effectively utilize the final providing information.

In detail, an administrator of the shopping mall server 100 may access the shopping mall server 100 via the terminal to browse the final providing information or data or the processed information or data and construct a mobile shopping mall quickly and easily using the browsed final providing information or data or the processed information or data. When converting a full or desktop version of an online shopping webpage, in which images are arranged randomly, to a mobile version of an online shopping webpage that requires a small number of images to be efficiently arranged due to a limited space, the administrator of the shopping mall server 100 may utilize the final providing information or data or the processed information or data.

Next, the data storage unit 120 may store at least one of an application program, data, and an instruction necessary for functional operation related to the web shopping mall and/or the image automatic classification.

For example, the data storage unit 120 may store and manage product images and/or product names on the web shopping mall.

Further, the data storage unit 120 may be various storage devices such as a ROM, a RAM, an EPROM, a flash drive, a hard drive, or the like, but not limited thereto, and may be a web storage that performs a storage function of the data storage unit 120 on the Internet, for example, but not limited to, cloud storage network.

Image Automatic Classification Server

Next, the image automatic classification server 200 may automatically classify various images of the web shopping mall based on a convenience of the mobile shopping mall administrator and generate reconfigured information or data so that the automatically classified images may be easily distinguished and identified.

Figure 3:
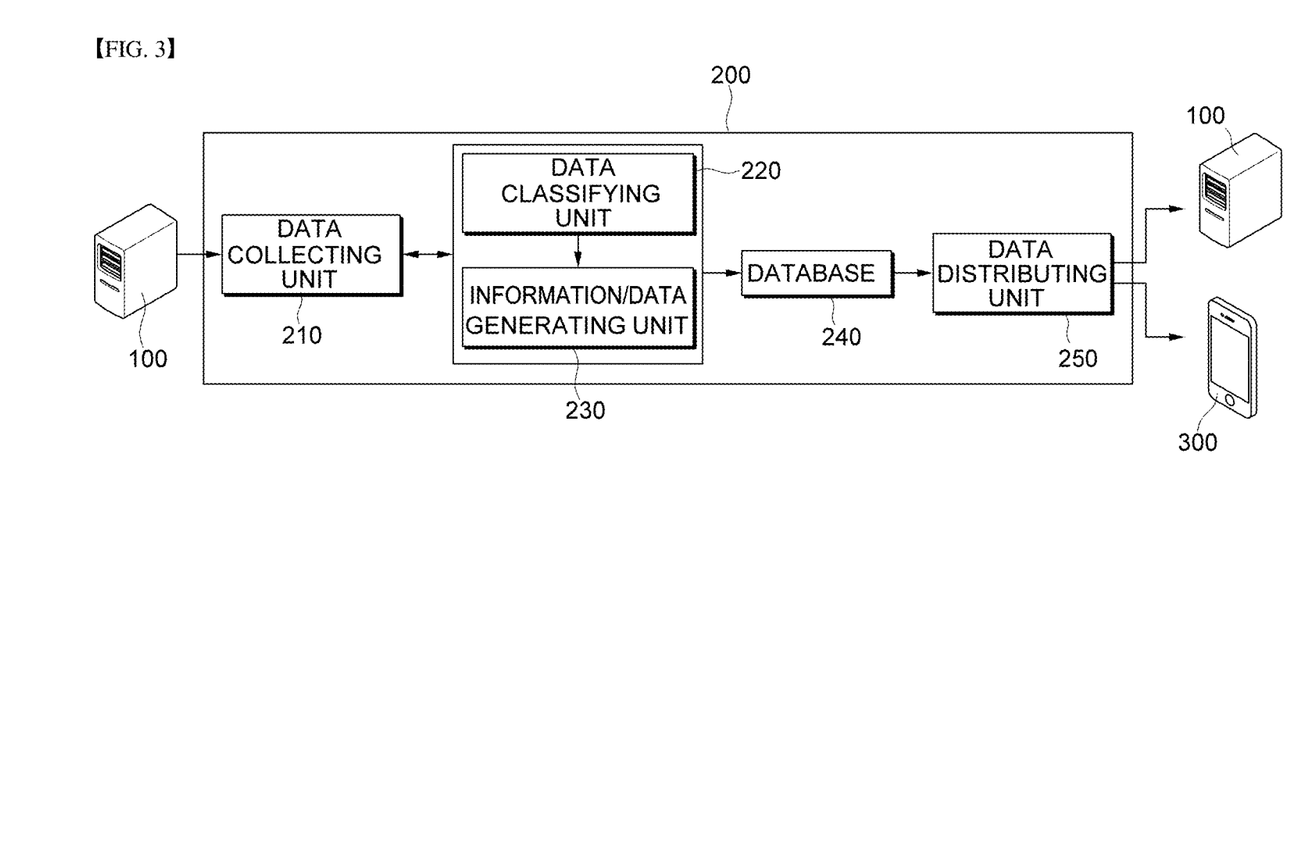
FIG. 3 is a block diagram of an image automatic classification server according to an embodiment of the present disclosure.

Exemplary components of the image automatic classification server 200 will be described in detail referring to FIG. 3. The image automatic classification server 200 may include a data collecting unit 210, a data classifying unit 220, a information/data generating unit 230, a database 240, and a data distributing unit 250.

First, the data collecting unit 210 may receive partial or entire contents of a product from the shopping mall server 100 or may be connected to the shopping mall server 100 to extract and store the partial or entire contents of the product.

Next, the data classifying unit 220 may analyze and classify the received and/or extracted partial or entire contents of the product using predetermined criterion and/or an image deep learning.

In this connection, when product contents include a plurality of product images and/or texts, and the like associated or connected with each other, the data classifying unit 220 may divide the connected product contents into the product images and/or texts.

Next, the information/data generating unit 230 may generate final providing information or data or the processed information or data by.

In this connection, the information/data generating unit 230 may generate the final providing information or data or the processed information or data further including information for providing the interface that may effectively utilize the final providing information or data or the processed information or data.

Next, the database 240 may store at least one of the application program, the data, and the instruction necessary for the functional operation related to the image automatic classification.

For example, the database 240 may store and manage the received and/or extracted partial or entire contents of the product, the product images classified based on the image classification criterion, and/or the final providing information or data or the processed information or data, and the like.

The database 240 may be various storage devices such as, but not limited to, a ROM, a RAM, an EPROM, a flash drive, a hard drive, or the like, or may be a web storage that performs a storage function of the database 240 on the Internet.

Next, the data distributing unit 250 may transmit the final providing information or data or the processed information or data and the like to the shopping mall server 100 and/or the terminal 300 to distribute the final output information via the image automatic classification.

Terminal

The terminal 300 may receive and display the final providing information or data or the processed information or data generated by the image automatic classification server 200 in the image automatic classification system and may provide an environment in which the mobile shopping mall utilizing the final providing information or data or the processed information or data may be used.

Further, the terminal 300 may be configured to provide means for utilizing the interface included in the final providing information.

This terminal 300 may be, for instance, a terminal of the administrator for constructing the mobile shopping mall.

Figure 4:
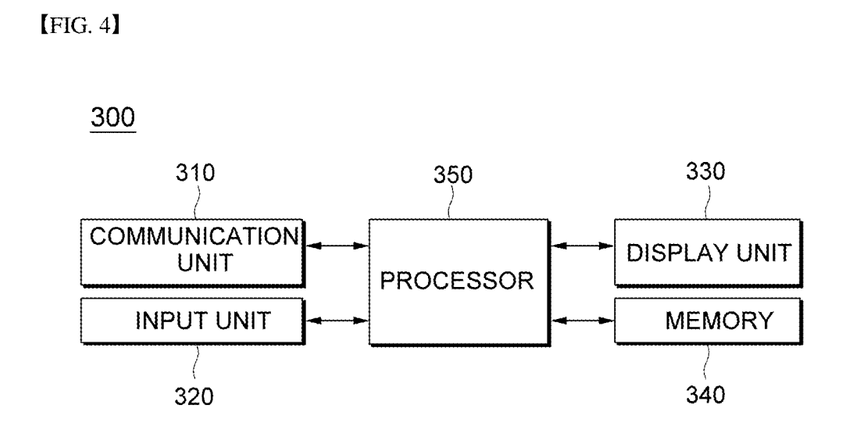
FIG. 4 is a block diagram of a terminal according to an embodiment of the present disclosure.

Referring to FIG. 4, the terminal 300 may include a communication unit 310, an input unit 320, a display unit 330, a memory 340, and a processor 350.

First, the communication unit 310 may transmit and receive various information related to the image automatic classification system.

For example, the communication unit 310 may receive the final providing information or data or the processed information or data generated by the image automatic classification server 200 and may transmit and receive related data for using the mobile shopping mall.

The communication unit 310 may transmit or receive a radio signal to or from at least one of a base station, an external terminal, and any server on a mobile communication network established based on technical standards for a mobile communication or a communication scheme, for example, a GSM (Global System for Mobile communication), a CDMA (Code Division Multi Access), a HSDPA (High Speed Downlink Packet Access), a HSUPA (High Speed Uplink Packet Access), a LTE (Long Term Evolution), a LTE-A (Long Term Evolution-Advanced), or the like.

Next, the input unit 320 may be configured to sense or receive a user's input associated with the image automatic classification system.

For example, the input unit 320 may detect or receive the user's input associated with the interface provided by the final providing information.

In detail, when a user's input for selecting a main shot is detected or received, the input unit 320 may display, on a screen, a sub-shot classified in the same category as the selected main shot.

Next, the display unit 330 may output a graphic image associated with the image automatic classification system.

For example, the display unit 330 may output and provide the final providing information or data or the processed information or data and/or the mobile shopping mall as the graphic image.

This display unit 330 may include, for example, but not limited to, at least one of a liquid crystal display (LCD), a thin film transistor-liquid crystal displays (TFT LCD), an organic light-emitting diodes (OLED), a flexible display, a 3-dimensional display (3D display), and an electronic ink display (e-ink display).

Further, the input unit 320 and the display unit 330 may be implemented as a touch screen.

Next, the memory 340 may store at least one of the various application programs, data, and instructions related to the image automatic classification system.

For example, the memory 340 may store an application capable of executing the mobile shopping mall utilizing the final providing information and the like.

This memory 340 may be various storage devices such as a ROM, a RAM, an EPROM, a flash drive, a hard drive, or the like and may be a web storage that performs a storage function of the memory 340 on the Internet.

Finally, the processor 350 may be configured to control an overall operation of each of the components described above and drive each of the components.

The processor 350 may be implemented using, for example, but not limited to, at least one of ASICs (application specific integrated circuits), DSPs (digital signal processors), DSPDs (digital signal processing devices), PLDs (programmable logic devices), FPGAs (field programmable gate arrays), controllers, micro-controllers, processor microprocessors, and electrical units for performing other functions.

A Method for Automatically Classifying Images

Hereinafter, prior to a detailed description of a method for automatically classifying images, an embodiment of the present disclosure may be described to be limited to the image automatic classification for one product among a plurality of products present on the web shopping mall for a more effective description. However, the automatic classification for images for other products other than the images for the said product may be performed in parallel and combined with each other in the same manner. Finally, the final providing information or data or the processed information or data may be generated in which images of all the products included in the web shopping mall are classified.

Figure 5:
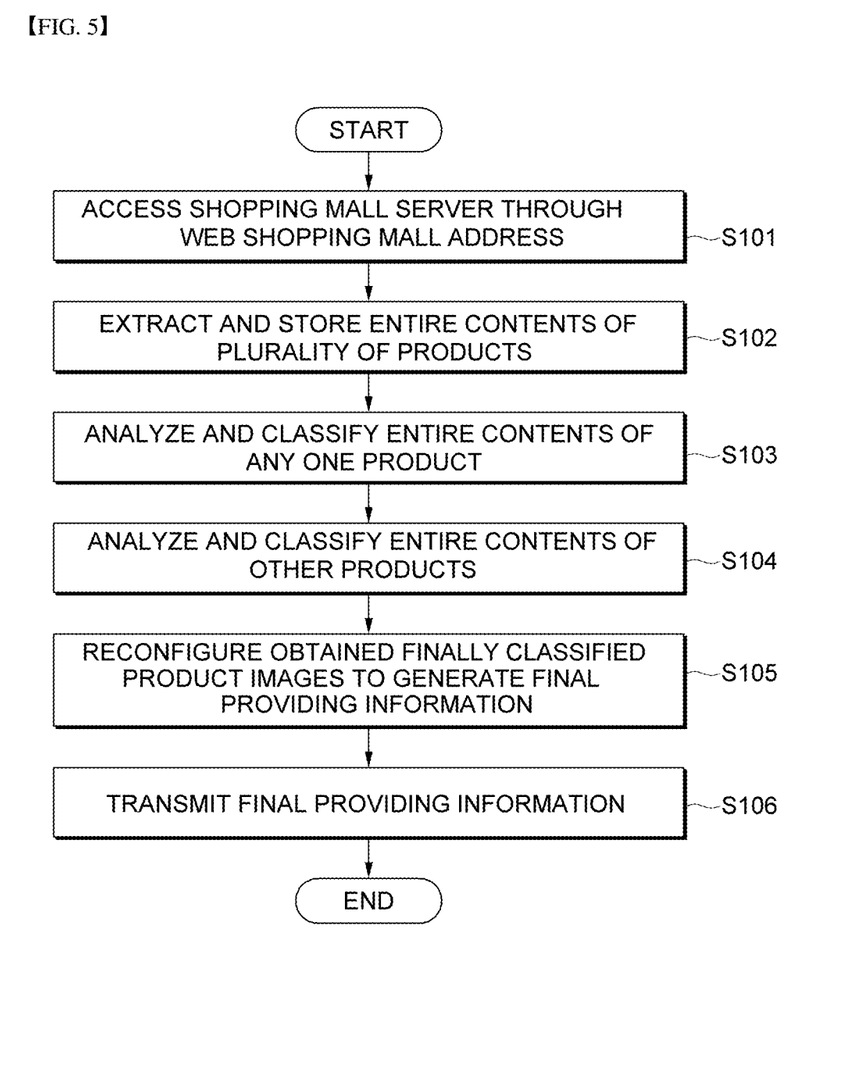
FIG. 5 is a flowchart of a method for automatically classifying images according to an embodiment of the present disclosure.
Figure 6:
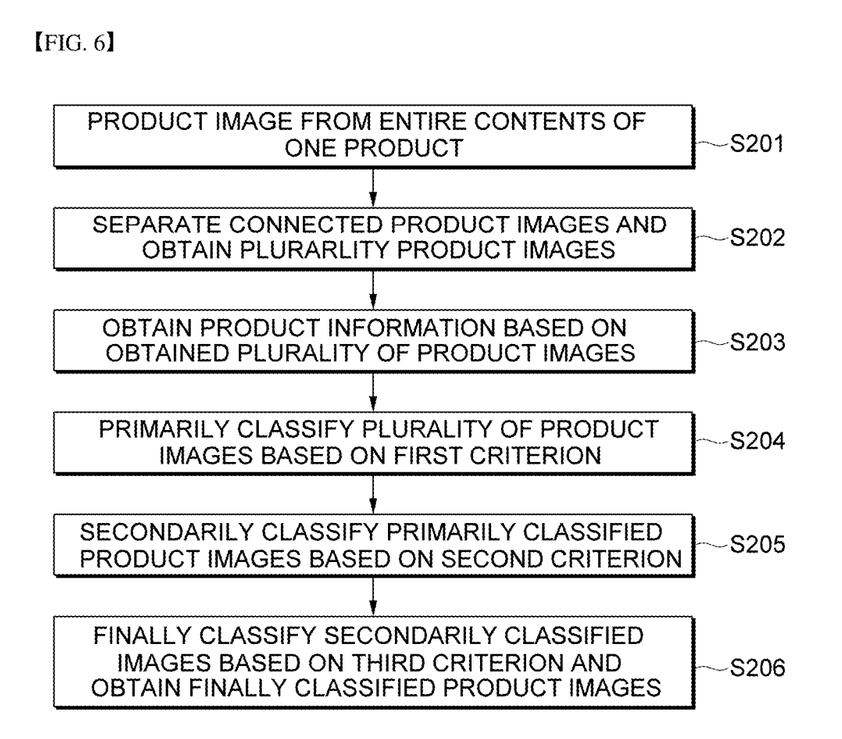
FIG. 6 is a detailed flowchart of a method for analyzing and classifying extracted entire or partial contents of one product according to an embodiment of the present disclosure.
Figure 7:
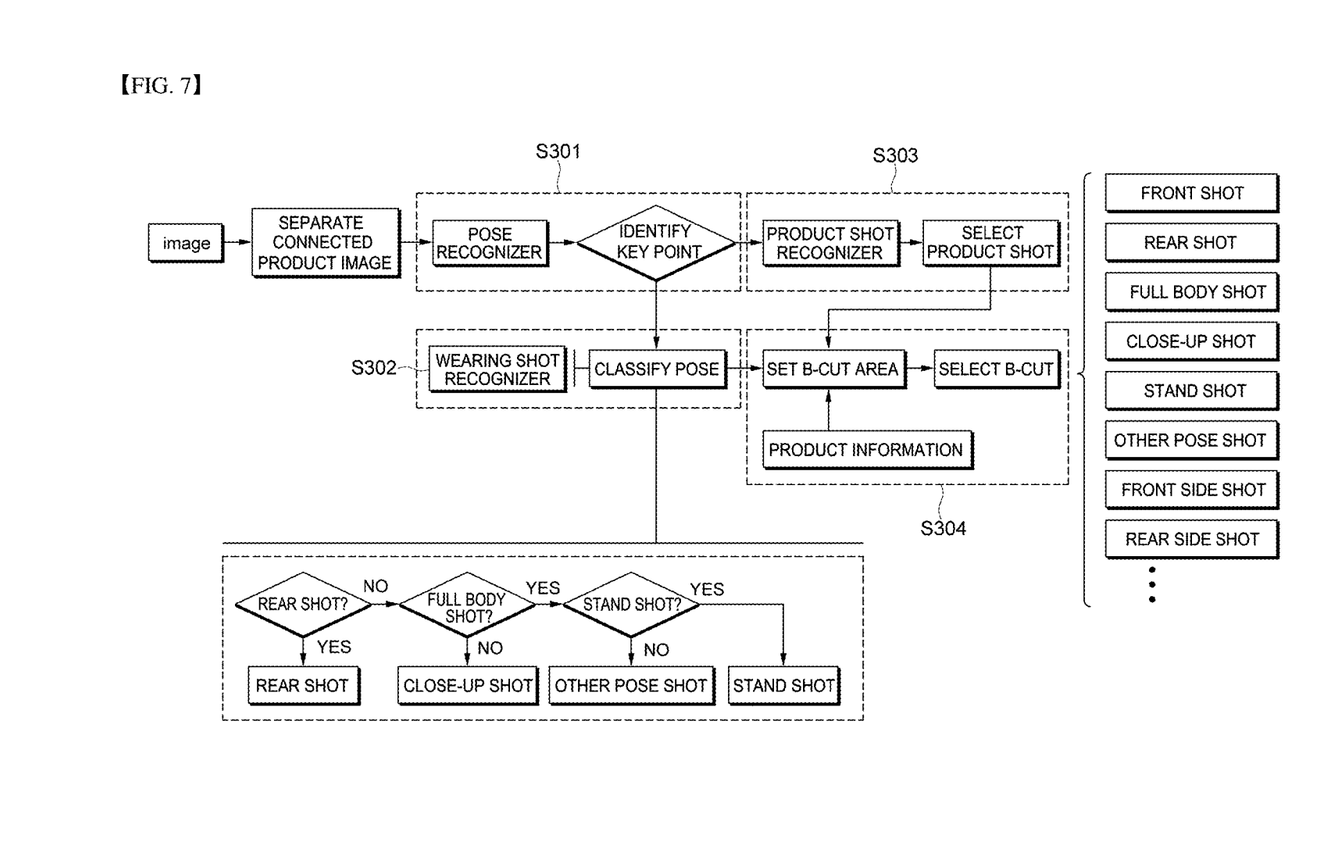
FIG. 7 is a detailed flowchart of a method for analyzing and classifying extracted entire or partial contents of one product according to another embodiment of the present disclosure.

FIG. 5 is a flowchart of a method for automatically classifying images according to an embodiment of the present disclosure. FIG. 6 is a flowchart of a method for analyzing and classifying extracted partial or entire contents of one product according to an embodiment of the present disclosure. FIG. 7 is a flowchart of a method for analyzing and classifying extracted entire contents of one product according to another embodiment of the present invention.

Referring to FIG. 5, the image automatic classification server 200 may access the shopping mall server 100 through a website address or a web shopping mall and extract partial or entire contents of one or the plurality of products from the connected shopping mall server 100 (S101 and S102).

Thus, the image automatic classification server 200 may extract partial or entire contents of one or more products to be subjected to the image automatic classification to obtain data based on the image automatic classification.

The partial or entire contents of the product refer to a set of part or all contents associated with or describing the product. For instance, the partial or entire contents of the product may include product images and/or texts, or the like related to the product used for posting the product on the web shopping mall.

In an embodiment of the present disclosure, the image automatic classification server 200 is connected to the shopping mall server 100 and extracts the partial or entire contents of one or more products. However, in another embodiments, the shopping mall server 100 may transmit the partial or entire contents of the product to the image automatic classification server 200.

Next, the image automatic classification server 200, which extracted and stored the partial or entire contents of the plurality of products at S102, may classify partial or entire contents of any one product among the plurality of extracted products (S103).

More specifically, referring to FIGS. 6 to 7, when one product image is detected among partial or entire contents of one product, which are for describing said one product, the image automatic classification server 200 may extract and separate the detected product image to obtain a plurality of product images (S201 and S202).

That is, the image automatic classification server 200 may separate and extract respective product images from partial or entire product contents in which a plurality of product images and texts are randomly arranged, in order to perform the image classification for each of the product images.

For example, the image automatic classification server 200 may separate the respective product images based on whether text, symbol and/or blank between the product images exists in order to separate only the product images from the partial or entire product contents connected to each other.

Thus, the image automatic classification server 200 may separate the connected product contents when it is determined that there is the text, symbol and/or blank between the detected product images.

In another embodiment, when the partial or entire contents of the product are received in a form of a script, the image automatic classification server 200 may extract only an extension file that represents an image in the script form to separate the product images.

Subsequently, the image automatic classification server 200 may obtain product information based on the plurality of the obtained product images (S203).

In detail, the image automatic classification server 200 may perform an image deep learning on the plurality of the obtained product images to obtain the product information.

In this connection, the product information may be, for example, but not limited to, information about a category to which each of the products belongs, such as a top, a bottom, and/or a dress.

In the embodiment, the image automatic classification server 200 may perform the image deep learning on at least one product image to obtain product information that indicates a type of the product corresponds to the 'top'.

For example, the image automatic classification server 200 may obtain product information using a fashion detector deep learning neural network that classifies clothing objects by an object type.

Next, the image automatic classification server 200 may perform a primary classification on the plurality of the obtained product images based on a first criterion (S204 and S301).

In the embodiment, the image automatic classification server 200 may distinguish the product images based on whether the product is worn as the first criterion. For example, the image automatic classification server 200 may classify product images in which a person or mannequin wearing a product is captured and product images in which only a product is placed and captured.

The image automatic classification server 200 may detect whether there is a pose in the product image in order to distinguish a wearing shot and a product shot.

In detail, the image automatic classification server 200 may use the image deep learning via a pose recognizer in order to detect whether there is the pose in the product image.

In this connection, the pose recognizer is an algorithm that determines whether there is the pose in a rule manner.

The pose recognizer may determine whether there is the pose based on predetermined rules and/or criteria.

More specifically, the pose recognizer may detect whether there is the pose in the product image, depending on whether a key point (e.g., a joint or the like) is extracted from the product image. In this connection, a key point for each pose may refer to a pattern of a feature vector when deep learning an image containing a person's pose.

Further, the pose recognizer determines that there is the pose when there is the key point and then classifies the product image including the pose as the wearing shot. On the other hand, when there is no key point, the pose recognizer determines that there is no pose and then classifies the product image as the product shot.

For example, the pose recognizer may input the product image to a convolutional neural network (CNN) that includes a convolutional layer, a rectified linear unit function, and a max pooling layer to obtain a feature vector for the product image as an output. Such a convolutional neural network may be an image deep learning algorithm optimized for pose recognition and pose classification, exhibiting an excellent performance in solving computer vision problems such as object recognition and distinction.

Thereafter, the pose recognizer may compare the feature vector with the key point. When a similarity degree between the feature vector and the key point is equal to or greater than a predetermined similarity degree, the pose recognizer may determine that there is a pose for the detected key point.

For example, the pose recognizer may determine whether there is the pose of the feature vector for the product image by placing a fully connected layer at a final output terminal. In summary, the image automatic classification server 200 that has determined whether there is the pose using the pose recognizer, which is a kind of the image deep learning, may classify the product image determined as including the pose into a wearing shot category (hereinafter "wearing shot"). Further, the image automatic classification server 200 may perform the primary classification that may classify the product image determined as not including the pose into a product shot category (hereinafter, product shot).

Next, the image automatic classification server 200 may secondarily classify the primarily classified product images based on second criterion (S205, S302, and S303).

In this connection, the image automatic classification server 200 may perform the secondary classification using different classification criteria depending on whether the primarily classified image is the wearing shot or the product shot.

First, when the primarily classified image is the wearing shot, the image automatic classification server 200 may be used based on a pose type in the wearing shot for the secondary classification.

In this connection, the image automatic classification server 200 may classify the wearing shot as an image belonging to at least one category based on the pose type of a pose image representing a front (hereinafter, referred to as a front shot), a pose image representing a rear (hereinafter, referred to as a rear shot), a pose image representing a full body (hereinafter, referred to as a full body shot), a pose image, which is closed-up (hereinafter, a close-up shot), a standing pose image (hereinafter, referred to as a stand shot) and/or other pose image (hereinafter, other pose shot).

Further, the image automatic classification server 200 may use a wearing shot recognizer algorithm during the image deep learning to determine the type of the pose in the wearing shot.

In this connection, the wearing shot recognizer is, for example, but not limited to, an algorithm for determining the type of the pose of the person or mannequin belonging to the product image in the rule manner. The wearing shot recognizer may be configured to determine the type of the pose based on predetermined rules and/or criteria.

More specifically, the wearing shot recognizer may secondarily classify the primarily classified wearing shots based on at least one of whether the wearing shot is 1) the rear shot, 2) the full body shot, and 3) the stand shot.

More specifically, the wearing shot recognizer may sequentially apply whether the wearing shot is 1) the rear shot, 2) the full body shot, and 3) the stand shot. First, the wearing shot recognizer may classify the rear shots from the primarily classified wearing shot based on whether the primarily classified wearing shots are the rear shots. Then, the wearing shot recognizer may classify the full body shots from the rest of the product images not including the rear shots based on whether the rest of the product images not including the rear shots are the full body shots. Then, the wearing shot recognizer may classify the stand shots from the rest of the product images not including the full body shots based on whether the rest of the product images not including the full body shots are the stand shots. Classifying the wearing shots in this order may improve image deep learning speed and accuracy.

For example, the wearing shot recognizer may sequentially input the feature vector output via the convolutional neural network into fully connected layers respectively learned by the rear shots, the full body shots, and the stand shots to distinguish the rear shot, the full body shot, and the stand shot.

In detail, when the feature vector is input to the fully connected layer learned by the rear shot image and is equal to or greater than a predetermined probability, the wearing shot recognizer may classify the wearing shot as the rear shot. Further, when the feature vector is less than the predetermined probability, the wearing shot recognizer may determine whether the wearing shot is the full body shot by inputting the feature vector to the next fully connected layer learned by the full body shots. The full body shot and the stand shot are distinguished in this manner, so that the wearing shots may be classified based on the pose type.

In summary, the image automatic classification server 200 determined the pose type using the wearing shot recognizer may perform the secondary classification that, when the wearing shot is determined as the rear shot, may classify the wearing shot into a rear shot category (hereinafter "rear shot") and, when it is determined that the wearing shot is not the rear shot, may classify the wearing shot into a front shot category (hereinafter "front shot").

Further, the image automatic classification server 200 may perform the secondary classification that, when the full body shot is determined as the stand shot, may classify the full body shot into a stand shot category (hereinafter "stand shot") and, when it is determined that the full body shot is not the stand shot, may classify the full body shot into another pose shot category (hereinafter "other pose shot").

For example, when one product image determined to be the wearing shot is determined to be the front shot, the full body shot, and the stand shot, the image automatic classification server 200 may classify said one product image as the stand shot. Further, when one product image determined to be the wearing shot is determined to be the front shot and the full body shot but is not to be the stand shot, the image automatic classification server 200 may classify said one product image as another pose shot.

On the other hand, when a primarily classified image is the product shot, the image automatic classification server 200 may classify the product shot based on whether the product shot is a detail shot for the secondary classification. In detail, when the key point is not detected in the feature vector output from the convolutional neural network, the product image may be classified as the product shot.

Thereafter, the product shot may be further classified based on whether the product shot is a product full shot or the detail shot and based on a view point when the product shot is the full shot. Such a classification scheme may be achieved via a product shot recognizer that is learned in a similar way to the pose recognition.

In other words, the product shot recognizer may also use the convolutional neural network and the convolutional neural network may be a network learned by detail shots, full shots, and product shots for each view point.

In this connection, the detail shot is a close-up image of a portion of the product.

Further, the image automatic classification server 200 may use the product shot recognizer and/or the image deep learning to determine whether the product shot is the detail shot.

In this connection, the product shot recognizer is an algorithm that determines the pose type in the rule manner.

The product shot recognizer may determine whether the product shot is the detail shot based on predetermined rules and/or criteria.

Further, the criteria of the secondary classification may be whether an overall form of the product in the product shot is recognizable.

Further, when the product shot is determined to be the detail shot, the image automatic classification server 200, which determined the pose type via the wearing shot recognizer, may perform the secondary classification that may classify the product shot into a detail shot category (hereinafter, referred to as detail shot).

In addition, the image automatic classification server 200 may perform the second classification on the product shot, which is determined not to be the detail shot, based on a view point of viewing a product in the product shot.

In this connection, the image automatic classification server 200 may use the product shot recognizer to determine the view point in the product shot.

In this connection, the product shot recognizer may determine whether the view point of viewing the product is a front side, a rear side, an upper side, a lower side, a left side, or a right side in the second classification.

Further, the image automatic classification server 200 which determined the view point using the product shot recognizer may perform the secondary classification that may determine the view point of viewing the product in the product shot, which is at least one of various view points such as the front side, the rear side, the upper side, the lower side, the left side, or the right side, and classify the product shot based on the view point.

In one embodiment, when it is determined that a view point of viewing a product in one product image is a front side, the image automatic classification server 200 may classify the product image into a front side shot category (hereinafter "front side shot").

Further, when it is determined that a view point of viewing a product in another product image determined to be the product shot is a left side, the image automatic classification server 200 may classify said another product image into a left side shot category (hereinafter "left side shot").

Hereinabove, in the embodiment described above, it is described that the image automatic classification server 200 uses the criteria such as the product information, whether the product is worn, whether there is the pose, the pose type, and/or the view point, or the like in order to classify the product image. However, various embodiments are possible within a scope that may be practiced by an ordinary skilled person.

Next, the image automatic classification server 200 may perform a final classification based on third criterion on the secondarily classified images and obtain finally classified product images via the final classification (S206 and S304).

Then, the image automatic classification server 200 may classify a main shot and a sub shot via the final classification.

In this connection, the main shot is an A-cut image that may be most representative of each the categories that classifies the product images.

Further, the sub shot means B-cut images excluding the main shot from each category that classifies the product images.

Again, the criterion that the image automatic classification server 200 classifies from the images, which are secondarily classified, into the main shot and the sub shot for the final classification may be a size of a product exposed area and/or a probability that the product image is applied to one category. In this connection, the size of the product exposed area means a size of an area or the number of pixels occupied by the product in the product image. Further, the probability that the product image is applied to one category is a degree to which the product image meets the classification criterion of the category.

In detail, the image automatic classification server 200 may classify the image as the main shot as the size of the product exposed area in the secondarily classified image is larger and may classify the image as the main shot as a probability that a category to which the secondarily classified image is classified and belonging is applied to the secondarily classified image is larger.

In one embodiment, when the secondarily classified image is the wearing shot, the image automatic classification server 200 determines whether a size of a product exposed area of one product image, which is a wearing shot secondarily classified into a specific category is larger than sizes of product exposed areas of other product images, which are secondarily classified into the same category as the specific category.

Further, when the size of the product exposed area of said one product image, which is the wearing shot, is the largest in comparison with the sizes of the product exposed areas of said other product images, the image automatic classification server 200 may classify said one product image as the main shot.

Further, the image automatic classification server 200 may perform the final classification for classifying the product image as the main shot when the said one product image, which is the wearing shot secondarily classified into the specific category, meets the classification criterion of the specific classification more than said other product images classified into the same category as the specific category.

Subsequently, the image automatic classification server 200 may perform the final classification that may classify remaining secondarily classified images, except the main shots classified for each category, as sub shots.

In another embodiment, when a secondarily classified image is a product shot, the image automatic classification server 200 may determines whether a size of a product exposed area of one product image, which is a product shot secondarily classified into a specific category, is larger than sizes of product exposed areas of other product images, which are secondarily classified into the same category as the specific category.

Further, when the size of the product exposed area of said one product image, which is the product shot, is the largest in comparison with the sizes of the product exposed areas of said other product images, the image automatic classification server 200 may perform the final classification that classifies said one product image as the main shot.

Further, the image automatic classification server 200 may perform the final classification for classifying said one product image, which is the product shot, as the main shot when the said one product image, which is the product shot secondarily classified into the specific category, meets classification criterion of the specific classification more than said other product images classified into the same category as the specific category.

Subsequently, the image automatic classification server 200 may perform the final classification that may classify the secondarily classified images except the main shots classified for each category as sub shots.

In this connection, in the embodiment, it is described that the image automatic classification server 200 performs the final classification for the secondarily classified product shot using the size or the number of pixels of the product exposed area and/or the probability that the category to which the product image is classified and belonging is applied to the product image. However, various embodiments may be applied such as another embodiment in which a shot at a specific view point (e.g., front side shot), which is determined to have the largest size of the product exposed area may be preset for the secondarily classified product shot and a final classification that classifies the preset shot at the specific view point as the main shot may be performed.

Figure 8:
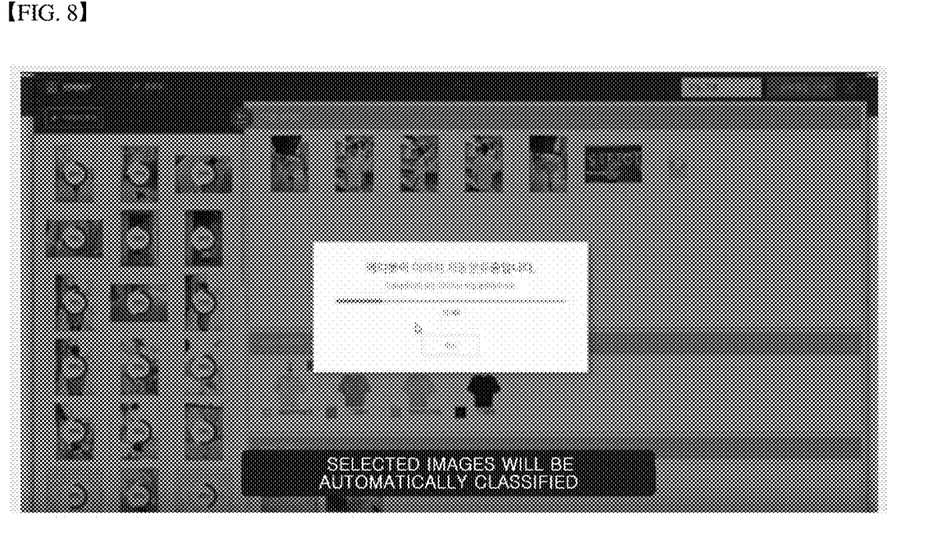
FIG. 8 is an example of an interface providing a function of analyzing extracted entire or partial contents of one product and classifying is being provided, according to an embodiment of the present disclosure.

Further, the image automatic classification server 200 may provide a screen as shown in FIG. 8 by performing operations of analyzing and classifying the extracted images as described above.

Thus, the embodiment of the present disclosure may automatically classify various product images randomly listed on a full version or desktop version of an online shopping site, such as the web shopping mall, in a priority order suitable for use in a mobile version of the online shopping site, such as the mobile shopping mall, based on various criterion. Therefore, the product images may be classified quickly and conveniently with less resources, and the product images may be more effectively delivered to the user in a mobile environment having a display smaller than that of a desktop or PC.

Again, in the description of FIG. 5, the image automatic classification server 200, which has completed the classification by analyzing the partial or entire contents of one product, may analyze and classify the partial or entire contents of other products (S104).

In detail, the image automatic classification server 200 may perform the image automatic classification for the partial or entire contents of other products in the same manner as the classification manner as described above for the partial or entire contents of one product.

In this connection, the partial or entire contents of other products may refer to the remaining partial or entire contents of other products except the partial or entire contents of one product randomly selected among the entire contents of the plurality of products extracted from the online shopping website/webpage or web shopping mall. Further, the image automatic classification server 200 may obtain the product images, which are finally classified via the image automatic classification for the partial or entire contents of other products in the same manner as the manner for obtaining the entire contents of one product. In this connection, in the embodiment of the present disclosure, it is described that, after performing the image automatic classification for the partial or entire contents of one product, the image automatic classification for the partial or entire contents for the other products is performed to obtain the finally classified product images. However, various embodiments may be possible in which image automatic classifications for partial or entire contents of some or all products posted on the web shopping mall are performed simultaneously to obtain finally classified product images.

Next, the image automatic classification server 200 may reconfigure the obtained finally classified product images to generate the final providing information (S105).

In detail, the image automatic classification server 200 may generate the final providing information based on the finally classified product images obtained via the image automatic classifications for the partial or entire contents of one product and/or the partial or entire contents of other products.

In this connection, the image automatic classification server 200 may reconfigure the finally classified product images so as to easily distinguish the product images based on the classification categories to generate the final providing information and may provide the final providing information further with information for providing the interface for effectively utilizing the final providing information.

Figure 9:
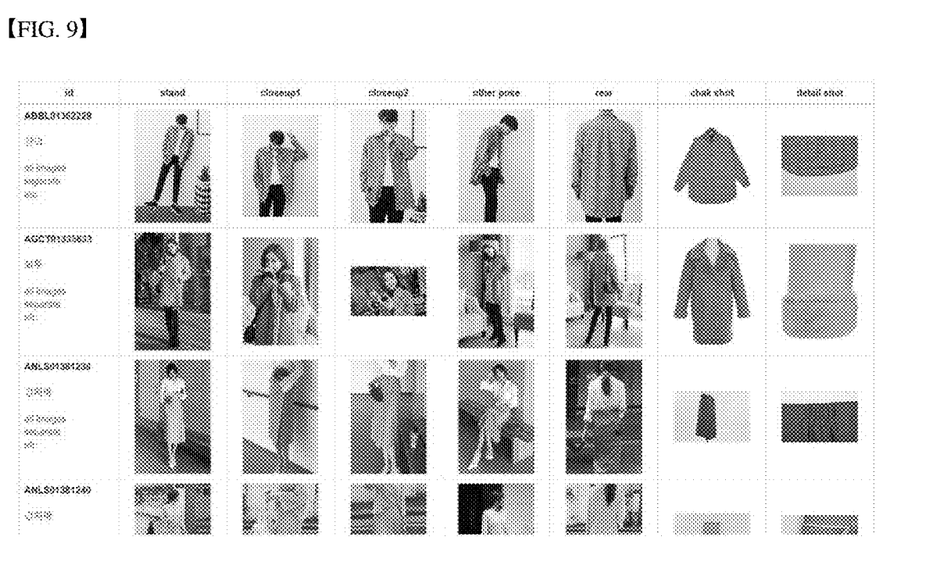
FIG. 9 is an example of an interface providing final providing information according to an embodiment of the present disclosure.

In detail, referring to FIG. 9, the image automatic classification server 200 may provide to a terminal of the user with product information for each product, a name for each category, and/or a main shot for each product and each category, or the like through the final providing information.

In detail, the entire final providing information may be in a form of a sequential listing of final providing information for each product. Further, the final providing information for each product may be in a form in which main shots of the product images corresponding to the product information for each product are sequentially listed for each category. That is, in the final providing information, product information of one product and main shots for each category may be sequentially arranged in a row, and rows representing the respective products may be arranged in a line.

Further, when an input is received from the user to select each product and a main shot for each category, the image automatic classification server 200 may provide an interface for collectively displaying the remaining sub shots belonging to a classification category of the main shot.

In one embodiment, when an input is received from the user to select a main shot of another pose shot of a first product, the image automatic classification server 200 may expose sub shots belonging to the other pose shot of the first product on a screen via a pop-up window.

In this connection, the image automatic classification server 200 may display the sub shots by arranging the sub shots in a descending order of a size of the product exposed area in each sub shot belonging to the sub shots. In another embodiment, the image automatic classification server 200 may display the sub shots by arranging the sub shots in a random order.

Thus, some embodiments of the present disclosure may effectively solve inconvenience that may occur when listing the product images on the mobile version of the online shopping site or the mobile shopping mall in the same manner as on the full or desktop version of the online shopping website/webpage or the web shopping mall. Further, certain embodiments of the present disclosure may allow a product image display suitable for the mobile environment by automatically classifying, organizing, and exposing the main shots for respective products the main shots rather than randomly displaying the product images on a mobile display smaller than a display of a desktop or PC.

Further, some embodiment of the present disclosure may allow the user to conveniently identify the images, which are automatically classified, by providing the interface that may utilize the final providing information generated via the image automatic classification.

Next, the image automatic classification server 200 may transmit the generated final providing information to the shopping mall server 100 and/or the terminal 300 (S106).

For example, the image automatic classification server 200 may generate the final providing information in a Json (Java Script Object Notation) file format and transmit the final providing information generated in the Json file format to the shopping mall server 100 and/or to the terminal 300.

As such, the image automatic classification server 200 may perform a data transmission combined with a lighter data format technology using the Json file format suitable for transmitting and receiving vast amounts of data and may transmit the generated final providing information more smoothly to the shopping mall server 100 and/or to the terminal 300.

As described above, the method and the system for automatically classifying the images according to certain embodiments of the present disclosure may provide the product images by automatically classifying the various product images randomly listed on the web shopping mall to be suitable for use in the mobile shopping mall. Therefore, the product images may be classified quickly and conveniently, and the product images may be more effectively delivered to the user in the mobile environment having the display smaller than that of the desktop or PC.

That is, the administrator may identify the main shot for each product and for each category at a glance via the final providing information to extract required main shot and sub shot with an easy interface. Further, the mobile version of the online shopping site or the mobile shopping mall may be constructed via the extracted images, thereby improving a convenience of the administrator.

Further, the method and the system for automatically classifying the images according to some embodiments of the present disclosure may reconfigure the automatically classified information with the interface to allow the user to conveniently identify the automatically classified images.

Certain embodiments of the present disclosure described above may be implemented with program instructions which may be executed through various computer components and may be recorded in computer-readable media. The media may also include, alone or in combination with the program instructions, data files, data structures, and the like. The program instructions recorded in the media may be designed and configured specially for the present invention or be known and available to those skilled in computer software. Examples of the computer-readable media include magnetic media such as hard disks, floppy disks, and magnetic tape; optical media such as CD-ROMs and DVDs; magneto-optical media such as floptical disks; and hardware devices that are specially configured to store and perform program instructions, such as read-only memory (ROM), random access memory (RAM), flash memory, and the like. Examples of the program instructions include both machine codes, such as produced by a compiler, and higher level codes that may be executed by the computer using an interpreter. The described hardware devices may be configured to act as one or more software modules to perform the operations of the present invention, or vice versa.

The particular executions described in the present invention are, as one embodiment, not intended to limit the scope of the present invention in any way. For brevity of the specification, descriptions of conventional electronic configurations, control systems, software, and other functional aspects of such systems may be omitted. Further, the connections or connection members of the lines between the components shown in the drawings are illustrative of functional connections and/or physical, or circuit connections, which may be illustrative of as replaceable or additional various functional connections, physical, or circuit connections in an actual device. Further, unless there is s specific mention, such as "essential", "importantly", and the like, the component may not be a necessary component for the application of the present invention.

Although the foregoing detailed description of the present invention has been set forth with reference to the preferred embodiment of the present invention. It will be understood by those skilled in the art that various modifications and changes may be made to the present invention without departing from the spirit and scope of the present invention as set forth in the following claims. Accordingly, the technical scope of the present invention should not be limited to what is described in the detailed description of the specification, but should be defined by the claims.

The method and the system for automatically classifying the images according to some embodiments of the present disclosure may provide product images by automatically classifying various product images randomly listed on an online shopping webpage to be suitable for use in a mobile version of the online shopping webpage or the mobile shopping mall. Therefore, the classification of the product images may be processed quickly and conveniently with less resources, and the product images may be more effectively delivered to the user in the mobile environment having the display smaller than that of the PC.

Further, the method and the system for automatically classifying the images according to certain embodiments of the present disclosure may reconfigure the automatically classified information with an interface which can allow the user to conveniently identify the automatically classified images.

What is claimed is:

1. A method for automatically classifying images performed by a processor of an image automatic classification server, the method comprising:
   receiving contents of a plurality of products from an online shopping web site;
   classifying the received contents of the plurality of products into each of the products and storing the contents classified by each of the products;
   extracting a plurality of product images of one product among the plurality of products from the stored contents; and
   automatically classifying the extracted product images of the one product into a plurality of categories to generate information for the one product, wherein the automatically classifying of the extracted product images of the one product into the plurality of categories includes classifying the product images into at least one category of a wearing shot and a product shot based on whether the one product is worn in each of the product images,
   wherein the information for the one product comprises information that classifies the plurality of product images of the one product for each of a plurality of categories to provide the classified product images.

2. The method of claim 1, further comprising obtaining product information of the one product based on the contents of the one product,
   wherein the product information of the one product includes information indicating a product type category to which the one product belongs.

3. The method of claim 1, wherein the extracting of the plurality of product images of the one product includes:
   detecting a text, symbol or blank positioned between the product images in the contents of the products; and
   separating the product images from each other based on the detected text, symbol or blank positioned between the product images.

4. The method of claim 1, wherein the classifying of the product images into at least one category of the wearing shot and the product shot includes:
   performing classification using a convolutional neural network learned to output a key point based on whether a pose exists as a feature vector in each of the product images.

5. The method of claim 4, wherein the convolutional neural network is configured to output the feature vector of each of the product images via a plurality of convolutional layers and a rectified linear function filter and classify the product images into at least one category of the product shot and the wearing shot based on a similarity between the feature vector and the key point.

6. The method of claim 5, wherein the classifying of the product images into at least one category of the wearing shot and the product shot includes:
   classifying the product images into the category of the wearing shot when the product images have the pose; and
   classifying remaining product images into the category of the product shot.

7. The method of claim 6, wherein the automatically classifying of the extracted product images of the one product into the plurality of categories includes:
   classifying the product images, which are classified as the category of the wearing shot, into at least one category of a front shot, a rear shot, a full body shot, a close-up shot, a stand shot or an other pose shot based on a pose type in each of the product images, which are classified as the category of the wearing shot.

8. The method of claim 7, wherein the classifying of the product images, which are classified as the category of the wearing shot, includes:
   selecting product images for the category of the rear shot from the product images, which are classified as the category of the wearing shot;
   classifying product images, not selected as the category of the rear shot among the product images, which are classified as the category of the wearing shot, to the category of the front shot;
   selecting product images for the category of the full body shot from the product images, classified as the category of the front shot, and then classifying product images, not selected as the category of the full body shot from the product images classified as the category of the front shot, as the category of the close-up shot; and
   classifying the product images selected as the category of the full body shot into the category of the stand shot and the category of the other pose shot.

9. The method of claim 8, wherein the convolutional neural network further includes a fully connected layer learned by the product images classified as the categories of the front and rear shots,
   wherein the fully connected layer learned by the product images classified as the category of the front shot receives the feature vector to determine whether the product image is the front shot, and
   wherein when one or more of the product images are not classified as the category of the front shot, the one or more of the product images are input to the fully connected layer learned by the product images classified as the category of the rear shot to determine whether the one ore more of the product images are the rear shot.

10. The method of claim 8, wherein the automatically classifying of the extracted product images of the one product into the plurality of categories includes:
   classifying the product images classified as the category of the product shot into at least one category of a front side shot, a rear side shot, an upper side shot, a lower side shot, a left side shot, or a right side shot based on a view point.

11. The method of claim 10, further including classifying detail shots capturing details of the one product from the product images classified as the category of the product shot.

12. The method of claim 10, wherein the automatically classifying of the extracted product images of the one product into the plurality of categories further includes:
classifying the product images, classified into at least one category of the front side, rear side, upper side, lower side, left side, or right side shots, into at least one category of a main shot and a remaining sub shot.

13. The method of claim 12, wherein the product images, classified into at least one category of the front side, rear side, upper side, lower side, left side, or right side shots, into at least one category of the main shot and the remaining sub shot are classified into at least one category of the main shot and the sub shot based on a size of a product exposed area in each of the product images or a probability of each of the product images that is classified as a corresponding category among the categories of the front side, rear side, upper side, lower side, left side, or right side shots.

14. The method of claim 13, wherein the information for the one product is information that includes product information for the one product, a name of the classified category, and a main shot of the classified category.

15. The method of claim 14, wherein the information for the one product includes information for an interface that, in response to an input of selecting the main shot of one category, displays remaining shots belongs to the one category.

16. The method of claim 12, further including generating the information for the one product as a file of a Json (Java Script Object Notation) format and transmitting the information for the one product to a terminal of a user.

17. A method for automatically classifying images performed by a processor of an image automatic classification server, the method comprising:
receiving contents of a plurality of products from an online shopping website;
classifying the received contents of the plurality of products into each of the products and storing the contents classified by each of the products;
extracting a plurality of product images of one product among the plurality of products from the stored contents; and
automatically classifying the extracted product images of the one product into a plurality of categories to generate information for the one product,
wherein the information for the one product comprises information that classifies the plurality of product images of the one product for each of a plurality of categories to provide the classified product images,
wherein the automatically classifying of the extracted product images of the one product into the plurality of categories includes:
automatically classifying the extracted product images into at least one category of a product shot in which only the product is placed and the other shot.

* * * * *